July 23, 1963 — E. MUNDT — 3,098,995

SERVO SYSTEM AND COMPARATOR

Filed Aug. 14, 1959 — 4 Sheets-Sheet 1

INVENTOR:
Edward Mundt
By Forrest J. Lilly
Attorney

July 23, 1963

E. MUNDT 3,098,995

SERVO SYSTEM AND COMPARATOR

Filed Aug. 14, 1959

INVENTOR:
Edward Mundt

By Forrest J. Lilly
Attorney

July 23, 1963

E. MUNDT

3,098,995

SERVO SYSTEM AND COMPARATOR

Filed Aug. 14, 1959

United States Patent Office 3,098,995
Patented July 23, 1963

3,098,995
SERVO SYSTEM AND COMPARATOR
Edward Mundt, Pasadena, Calif., assignor to Hycon Mfg.
Company, Pasadena, Calif., a corporation of Delaware
Filed Aug. 14, 1959, Ser. No. 833,880
15 Claims. (Cl. 340—146.2)

My invention relates generally to servo positioning and follower systems, and more particularly to a new and useful positioning and/or follower system incorporating a novel comparator for comparing the contents of two digital counters or the like.

Generally, in a positioning system wherein a movable device is controlled in position within some frame of reference, command or reference position data is supplied and this data is compared with data giving the true and instantaneous position of the movable device within the reference frame. The difference between the compared data provides data, which can be positive or negative, describing the error in position between reference and true positions. The error data can be used to adjust the position of the movable device such that the error in position is reduced and finally removed. If the reference or command data varies, the error data also varies so that correction of position by reduction of the error difference results in a continuously moving or follower system.

It is an object of my invention to provide a positioning and follower system wherein digital counters can be employed to store and supply data describing both the reference and true positions of a movable device in a reference frame.

Another object of my invention is to provide a novel comparator for use in a positioning and/or follower system employing digital counters, to compare the contents of the counters for an error control signal.

A further object of the invention is to provide an extremely accurate and efficient servo positioning and follower system including digital counters for storage of reference and true positional data of a controlled device.

A still further object of this invention is to provide a highly effective positioning and follower system for controlling the position and movement of a carriage along the length of a lead screw.

Briefly, and in general terms, the foregoing and other ancillary objects of my invention are preferably accomplished by providing a comparator for comparing the contents of a true position counter with that of a reference position counter to derive an error signal which is fed to a differential operational amplifier, the output of which is used to energize a servomotor that drives a lead screw to position a carriage riding thereon. Rotation of the lead screw and movement of the carriage is accompanied by actuation of means which generate suitable signals to alter the contents of the true position counter according to the instantaneous position of the carriage on the lead screw, until the contents of the true position counter are matched with that of the reference position counter. The contents of the reference position counter can be variable and the system is thus both a positioning and follower system. The comparator is also novel in structure and normally includes a digital and an analogue section to provide a digital and proportional control servo system. The digital section can be used alone as the comparator in a low gain servo system and still provide satisfactory control.

My invention includes other objects and features, some of which together with the foregoing, will be set forth in the following detailed description of a preferred embodiment of my invention, and the invention will be more fully understood by reading the description with joint reference to the attached drawings, in which:

Figure 1:
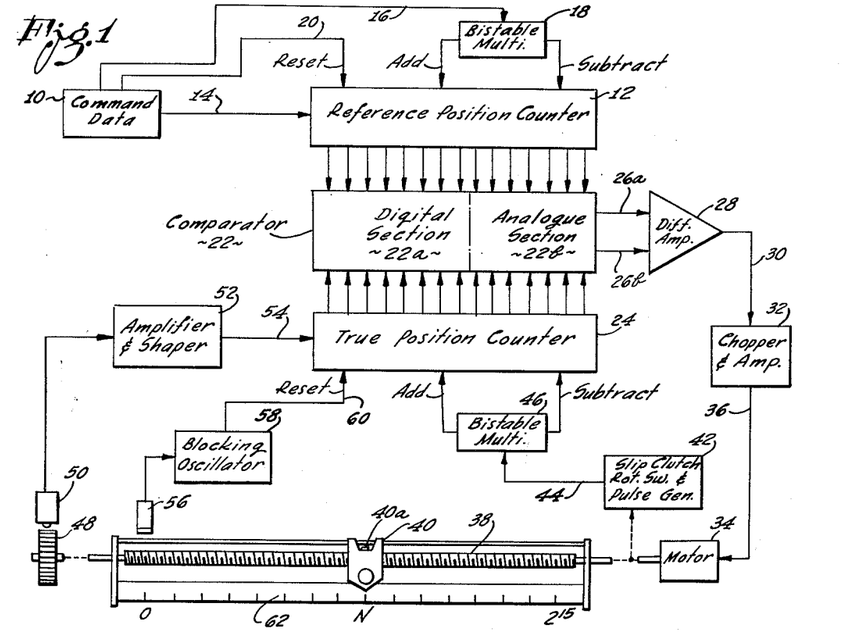
FIGURE 1 is a schematic block diagram of a preferred embodiment of my invention.

A positioning and follower system for controlling the instantaneous position of a carriage along a lead screw is shown in FIGURE 1. Command data 10 which can be provided, for example, from punched or magnetic tape, controls the numerical contents of a reference position counter 12. The counter 12 is preferably a binary counter of conventional construction having fifteen binary stages, for example. The stages are connected in ordinary chain fashion and each stage comprises a commercial available bistable multivibrator binary circuit such as type PM7253, manufactured by the Walkrit Company of Inglewood, California. Serial input pulses can be provided to the counter 12 on lead 14, and add-subtract control pulses can be supplied on lead 16 which trigger a bistable multivibrator 18, similar to a binary stage, that governs whether the counter 12 will count forwards or backwards for each input pulse. The reversible counter 12 can be reset by a pulse appearing on lead 20.

An output from each stage is applied to a comparator 22 which includes a digital section 22a and an analogue section 22b. The outputs representing the first eight most significant digits, for example, are provided to the digital section 22a and the other outputs representing the remaining seven digits of the counter 12 can be supplied to the analogue section 22b of the comparator 22. A true position counter 24 which is identical to the reference position counter 12 provides outputs representing the fifteen digits of counter 24. The outputs of counter 24 are applied to the comparator 22 in the same manner as the outputs of counter 12 are applied to the comparator 22. The outputs of counter 24 are compared with the outputs of the counter 12 by comparator 22. A large (forward) command signal is obtained on output lead 26a than on lead 26b if the contents of the reference position counter 12 is greater than the contents of the true position counter 24, and a larger (reverse) command signal is obtained on output lead 26b than on lead 26a if the contents of counter 12 is less than the contents of counter 24. Voltages (not necessarily yielding a resultant differential) can appear simultaneously on both leads 26a and 26b because of voltage outputs from the analogue section 22b but not from the output of the digital section 22a, as will become apparent from the subsequent ensuing description of the comparator 22, and equal outputs on both leads 26a and 26b are obtained when the contents of counters 12 and 24 are equal (matched).

The signals on leads 26a and 26b are applied respectively to inverting and non-inverting inputs of a differential operational amplifier 28 to produce a positive (forward command) or negative (reverse command) output signal on lead 30. The output signal on lead 30 is chopped and amplified by chopper and amplifier 32, and an alternating signal of proper phase is applied to servomotor 34 through lead 36. The servomotor 34 drives a lead screw 38 which, in turn, moves a carriage 40 along its length. The motor 34 is also suitably linked mechanically to actuate a sensitive single pole, double throw switch (not shown), which pole is spring loaded to a center, open position. The spring loaded pole of the switch can be rotatably mounted on an axle which is coupled to be driven by motor 34 through a slip clutch (not shown). When the motor output shaft rotates in one direction, the pole of the switch is rotated a short distance in a corresponding direction until it is stopped by a switch contact. This closes the switch and at the same time forces the slip clutch to slip as the motor 34 continues running. When the motor 34 stops, the pole of the switch is returned to center position by spring force. The pole of the switch is similarly rotated in an opposite direction to close the switch in a second position when the motor 34 rotates in a reverse direction. The pole of the switch is connected to a source of direct voltage and the switch contacts are both connected capacitively to the input of a pulse generator (not shown) which can be a conventional one shot multivibrator. The slip clutch, rotatable switch and pulse generator are indicated by block 42 in FIGURE 1. The pulse output of the pulse generator is applied through lead 44 to a bistable multivibrator 46 which controls forward or backward counting of the counter 24 for the input pulses fed thereto. The block 42 represents a means for triggering the bistable multivibrator 46 (changing its state) on reversal of direction of rotation of the motor 34. Other means for accomplishing this function can, of course, be utilized. A tachometer generator, for example, coupled directly to motor 34, can be used with a suitable anticipation circuit to sense reversal of motor direction, and control the bistable multivibrator 46. Extremely sensitive means of greater complexity can be employed according to the degree of accuracy of operation that is desired, and the particular means described above is illustrative only of a simple and effective embodiment of such means.

A small magnetic drum 48 is also mechanically connected to the lead screw 38 and is rotated therewith. The drum 48 is magnetized in equal, closely spaced intervals around the periphery such that pulses are induced in magnetic pickup head 50 when the drum 48 is rotated. These pulses are fed to amplifier and shaper 52, and are amplified and suitably shaped for application to the input of the counter 24 through lead 54. The pulses appear on lead 54 serially and cannot overlap because of the fixed spacing of the magnetized elements on the drum 48. Thus, when the motor 34 rotates the lead screw 38 to drive carriage 40 and the magnetic drum 48, the contents of counter 24 is properly altered with the position of carriage 40 along the lead screw 38.

At index position, when the carriage 40 is at its leftmost position on the lead screw 38 in FIGURE 1, a lamp 49a suitably mounted on the carriage 40 directs a small beam of light towards a photo transistor 56. The output signal from the photo transistor 56 is used to trigger a monostable blocking oscillator 58 that produces a reset pulse output on lead 60. The true position counter 24 is reset by applying the reset pulse to a corresponding emitter of each stage, in parallel to all of the counter stages in the usual manner. The contents of the counter 24 and the index position of the carriage 40 is thus synchronized properly. The maximum travel of the carriage 40 to the right in FIGURE 1 corresponds to the maximum binary content of the counter 24, and other positions of the carriage 40 are, of course, proportionate to the contents of counter 24. Since the counters 12 and 24 each includes fifteen binary stages, the maximum content or capacity of each counter is $2^{15}$, and this represents maximum travel to the right in FIGURE 1 on the lead screw 38. The digital section 22a of the comparator 22 in one version encompasses eight digital stages which establish the position of carriage 40 on the lead screw 38 as determined by the first eight most significant digits along the lead screw 38. The analogue section 22b then establishes the carriage 40 final position according to the remaining seven digits of the compared contents of counters 12 and 24. The carriage 40 indicates against a scale 62 having end graduation marks labeled 0 and $2^{15}$ as shown in FIGURE 1. The intervening space is divided into equal divisions of suitable separation. The zero mark is, of course, the index or reference point and the last mark indicates the farthest permissible travel to the right of carriage 40 on the lead screw 38. This latter position corresponds to the maximum content of the two counters 12 and 24, as stated previously.

Figure 2:
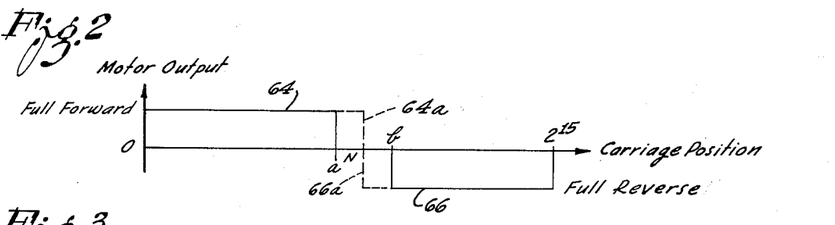
FIGURE 2 is a graph plotting control characteristics of the preferred system due to the digital section of a comparator in the system.

System response as produced by the digital section 22a of the comparator 22 is indicated in FIGURE 2. A graph plotting the output speed of motor 34 as governed by the digital section 22a is illustrated by the positive and negative steps 64 and 66. If N is the commanded position for the carriage 40 and if the carriage 40 is anywhere outside the exaggerated distance a—b shown in FIGURE 2, the motor 34 is energized either at full forward speed or full reverse speed, depending on whether the carriage 40 is actually in the steps 64 or 66, respectively. If the comparator 22 was comprised entirely of digital binary stages; that is, a completely digital comparator, then the distance a—b can be eliminated and the steps 64 and 66 are extended to meet at N as indicated by the broken lines 64a and 66a. Such a completely digital comparator is fully effective to position the carriage 40 at the commanded position and is an extremely useful device in itself.

Figure 3:
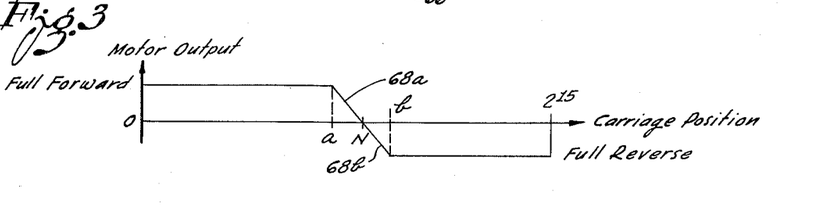
FIGURE 3 is another graph plotting control characteristics of the preferred system due to combined digital and analogue sections of the comparator.

The lead screw 38 rotates at, for example, 120 r.p.m. when driven at full speed by the motor 34. Since the best servomechanism performance (highest gain) is obtained with a proportional control servo, the last seven digits of the counters 12 and 24 are compared in an analogue section 22b which provides proportional control within the interval a—b of the graphs shown in FIGURES 2 and 3. Lines 68a and 68b in FIGURE 3 decrease linearly from a full forward or full reverse condition proportionately to zero at the commanded position N. The graph shown in FIGURE 3 illustrates system response for a commanded position N wherein the comparator includes both a digital section and an analogue section. It is noted that any output of the digital section 22a preferably overrides the output from the analogue section 22b until, for example, the first eight most significant digits of counters 12 and 24 are matched, so that a zero output due to the digital section 22a of comparator 22 is obtained. Thus, the carriage 40 must reach either points a or b in FIGURE 3 and therefore within the seven least significant digits of the commanded position from either direction before proportional control becomes effective.

Figure 4:
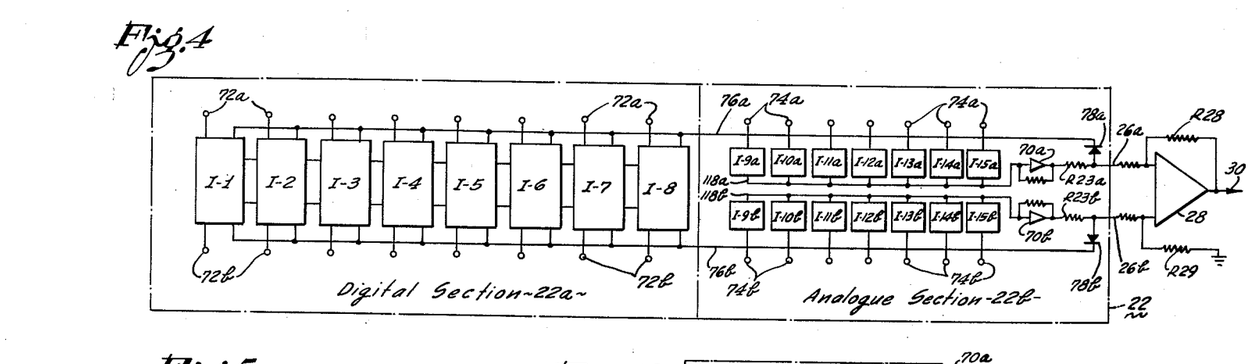
FIGURE 4 is a block diagram of a preferred embodiment of a comparator which can be used in a digital servo positioning system.

The comparator 22 including the digital section 22a and analogue section 22b, and the differential operational amplifier 28 is shown in generally block diagram form in FIGURE 4. The digital section 22a comprises eight stages, for example, which are labeled I–1 through I–8. Stages I–2 through I–6 are identical, and stages I–1, I–7 and I–8 are similar to the other stages except for the omission of some components which are not necessary in the latter stages. The analogue section 22b comprises two identical linear combiners, a reference position combiner including stages I–9a through I–15a which feed an operational amplifier 70a, and a true position combiner including stages I–9b through I–15b which feed an operational amplifier 70b. The corresponding stages such as stages I–9a and I–9b are identical, and all of the stages I–9a through I–15a and I–9b through I–15b are similar. The outputs from the fifteen counter stages of the reference position counter 12 can be applied to the upper input terminals 72a and 74a of the digital section 22a and the analogue section 22b, respectively. Similarly, the outputs from the fifteen counter stages of the true position counter 24 can be applied to the lower input terminals 72b and 74b of the comparator 22. The first eight most significant digits, for example, of each counter 12 or 24 are applied to inputs of the digital section 22a, and the remaining seven digits of each counter are applied to inputs of the analogue section 22b.

As is well known, the base is 2 in a binary system, and only two numerals 0 and 1 are used to represent a number. The output signal from a counter stage is obtained from the plate (or collector) of one of the two elements of a bistable multivibrator, in the counters 12 and 24. When the selected output anode voltage is low in a counter stage, the digit 0 is normally represented by that particular counter stage, and when the selected output anode voltage is high, the digit 1 is normally represented. Of course, when one anode of a two-tube bistable multivibrator is high, the other anode will be low. Thus, since a counter stage may represent the digit 1 for a specified state of the bistable multivibrator, and an output can be obtained from either anode, the connected output anode voltage can be selected to be either high or low to indicate, respectively, the digit 1 or its (register) complement, the digit 0, when the counter stage (bistable multivibrator) is in the specified state. A low voltage applied to the input terminals 72a, 72b and 74a, 74b can therefore represent either a 0 or 1 digit in the corresponding counter stage, depending upon which anode of the bistable multivibrator the output lead is connected to when the counter stage is in the specified state. For the counters 12 and 24, high and low output voltages of each stage are, for example −6 and 0 volts, respectively. Suitable output connections to those counter stages which feed the digital section 22a of comparator 22 are made to anodes each of which provides a high output voltage (−6 volts) when the corresponding counter stage is in a state that represents the digit 1. The remaining counter stages which supply the analogue section 22b, however, have output connections to anodes that each provides a low output voltage (0 volts) when the corresponding counter stage is in a state that represents the numeral 1. The complement of the digit existing in an analogue section counter stage is thus supplied to the analogue section 22b of comparator 22 in FIGURE 4. Outputs from the digital section 22a appear on leads 76a and 76b and are respectively combined with the outputs of the analogue section 22b through blocking diodes 78a and 78b to provide inputs on leads 26a and 26b to the differential operational amplifier 28.

Figures 5, 6:
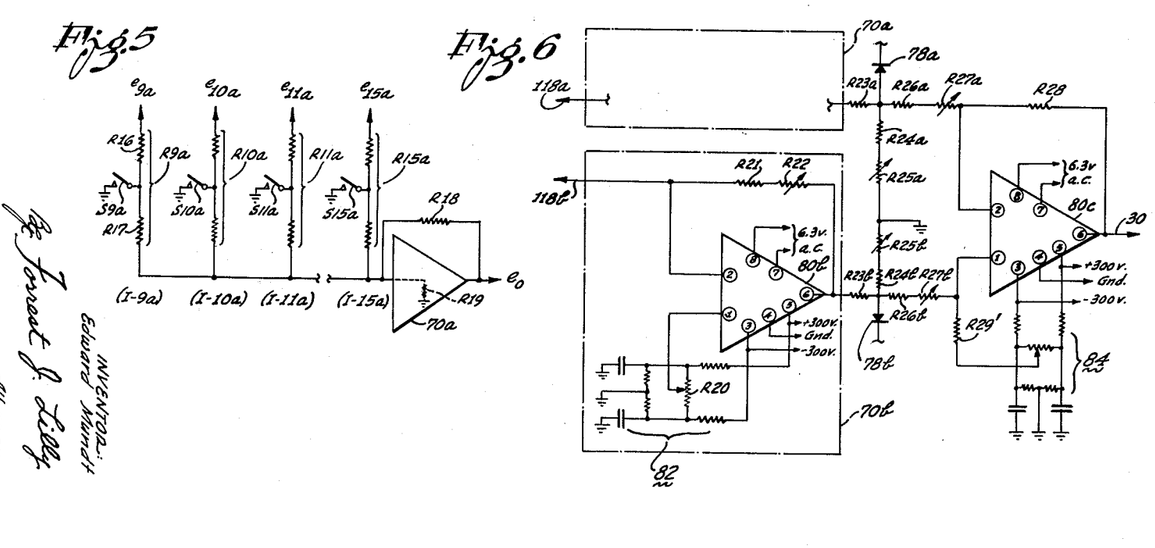
FIGURE 5 is a schematic wiring diagram for explaining operation of the analogue section of the comparator in the preferred system.
FIGURE 6 is a wiring diagram showing connections of the output of the comparator with a differential operational amplifier.

A linear combiner of the analogue section 22b of comparator 22 is schematically depicted in FIGURE 5. The stage I–9a comprises two resistors R16 and R17 which are connected in series, the combined resistance being labeled R9a. The common junction between resistors R16 and R17 is connected to ground through a switch S9a, the other end of resistor R16 is connected to a voltage source $e_{9a}$, and the other end of resistor R17 is connected to the input of the operational amplifier 70a as shown. The operational amplifier 70a has a feedback resistor R18 and an effective input resistance R19 as indicated in FIGURE 5. The other stages I–10a, I–11a, I–12a, I–13a, I–14a, and I–15a are similar to the first stage I–9a. The output voltage $e_o$ for the linear combiner is given by the following equation:

$$-e_o = \frac{R18}{R9a} \cdot e_{9a} + \frac{R18}{R10a} \cdot e_{10a} + \frac{R18}{R11a} \cdot e_{11a} + \frac{R18}{R12a} \cdot e_{12a}$$
$$+ \frac{R18}{R13a} \cdot e_{13a} + \frac{R18}{R14a} \cdot e_{14a} + \frac{R18}{R15a} e_{15a}$$

The value chosen for R10a is equal to 2R9a, that for R11a is equal to 4R9a, and continuing for each stage in sequence with values of $2nR9a$ where $n$ is the total number of stages to the considered stage less one. The values of resistances R9a and R13 are fixed, and all of the stage voltages $e_{9a}$, $e_{10a}$, $e_{11a}$, $e_{12a}$, $e_{13a}$, $e_{14a}$, and $e_{15a}$ are also fixed and equal in magnitude. If all of the switches S9a, S10a, S11a, S12a, S13a, S14a and S15a are closed, then $e_o$ is zero. Opening switch S9a produces an output voltage $e_o$ proportional to $e_{9a}$, and the further opening of switch S10a, in sequence, adds a proportional voltage $e_{10a}/2 (=e_{9a}/2)$ to the output voltage $e_o$, or $e_{9a}+e_{9a}/2$. This progresses additively in binary decreasing fashion with the continued sequential opening of switches. It is noted that the value of resistor R17 is approximately 96K ohms while the input resistance R19 of the operational amplifier 70a is about 10 ohms. Since the resistors corresponding to R17 in the other stages I–10a, I–11a, I–12a, I–13a, I–14a, and I–15a are essentially doubled that for a preceding stage, closure of switch S9a, for example, to ground with other switches open does not alter the accuracy of the output voltage $e_o$ as defined by the above equation. That is, because the input impedance of the operational amplifier 70a is relatively very low, current flow diverted from resistance R19 to resistor R17 by closure of switch S9a is negligible and imperceptible, and the system therefore produces an accurate output voltage $e_o$.

The operational amplifier 70b, which is identical to 70a, is shown in somewhat fuller detail in FIGURE 6. A model K2–W Operational Amplifier manufactured by George H. Philbrick Researches, Inc., of Boston, Massachusetts, is indicated as 80b. Circled numbers within the triangle 80b are pin numbers for the device, which is a plung-in unit. Pin 1 is connected directly to an adjustable tap of a potentiometer R20 which is connected in a biasing circuit 82 as shown in FIGURE 6. The tap is normally adjusted to provide approximately 1.3 volts, for example, on pin 1 to produce a zero output for a zero input voltage. However, in the present invention the tap is adjusted in one version whereby a zero input produces −50 volts output, and −50 volts input produces a zero volt output. Pin 2 is usually termed the inverting input and is connected to all of the outputs of stages I–9b through I–15b. Pin 2 is also connected to pin 6, which is the output terminal, through series connected resistors R21 and R22. The series resistors R21 and R22 comprise the so-called feedback resistor. The resistor R22 can be adjustable as indicated. The other pins 3, 4, 5, 7 and 8 are connected as shown in FIGURE 6. The operational amplifier block 70a is identical to 70b including all connections and component values.

The output of the operational amplifier 70a can be connected to ground through three series connected resistors R23a, R24a, and R25a, and the output of the operational amplifier 70b can be similarly connected to ground through series resistors R23b, R24b, and R25b. The anode electrode of diode 78a is connected to the common junction between resistors R23a and R24a. The series resistors R23a, and R24a, and R25a comprise a voltage divider, and an input, pin 2, of the operation amplifier 80c is connected to both the anode electrode of diode 78a and the common junction between the resistors R23a and R24a through two series connected resistors R26a and R27a. Similarly, the series resistors R23b, R24b, and R25b also comprise a voltage divider, and another input, pin 1, of the operational amplifier 80c is connected to both the anode electrode of diode 78b and the common junction between the resistors R23b and R24b through two series connected resistors R26b and R27b. The two voltage dividers divide the output voltages from the operational amplifiers 70a and 70b by a factor of approximately 10. The maximum output of −50 volts is thus reduced to approximately −5 volts to the inputs of the operational amplifier 80c. A fixed negative voltage of, for example −6 volts appears through one or the other of the diodes 78a and 78b whenever the inputs to digital section 22a of the comparator 22 are not matched, and this greater voltage overrides any output differential from the two analogue operational amplifiers 70a and 70b which can have simultaneous outputs.

The operational amplifier 80c is connected as a differential operational amplifier 28 having two inputs, a feedback resistor R28 connecting with one input and a grounding resistor R29 connecting with the other input as indicated in FIGURE 4. In FIGURE 6, a resistor R29' connects the input from pin 1 to ground through the comparatively small resistances in the biasing circuit 84. The biasing circuit 84 is adjusted to produce a zero output voltage for equal (zero differential) input voltages to the differential operational amplifier 28. The input at pin 1 is a non-inverting input, and a negative input voltage on pin 1 produces a negative output voltage on pin 6 and lead 30. This negative output voltage is the reverse command signal for servomotor 34. The input at pin 2 is the inverting input, and a negative input voltage on pin 2 produces a positive output voltage on pin 6 and lead 30. This positive output voltage is the forward command signal for the servomotor 34. The input voltages to the differential operational amplifier 28 can be −6 volts from one or the other diode 78a or 78b applied to one input and a smaller negative voltage applied to the other input from one of the operational amplifiers 70a or 70b. When the overriding, full speed positioning of the carriage 40 is accomplished, so that the voltages through diodes 78a and 78b are both zero, proportional control commences and is dependent upon the gradual decrease of output voltage difference between the outputs of the analogue operational amplifiers 70a and 70b. The output voltage of the operational amplifier 70b equals that of 70a when the carriage 40 is correctly positioned on the lead screw 38. It should be noted that the different corresponding stages of the two linear combinors of the analogue section 22b are not necessarily matched in any particular sequence. That is, in FIGURE 4, the stage I-9b, I-10b, I-11b, I-12b, I-13b, I-14b, and I-15b can match the conditions of corresponding stages I-9a, I-10a, I-11a, I-12a, I-13a, I-14a, and I-15a in a random manner.

Figure 7:
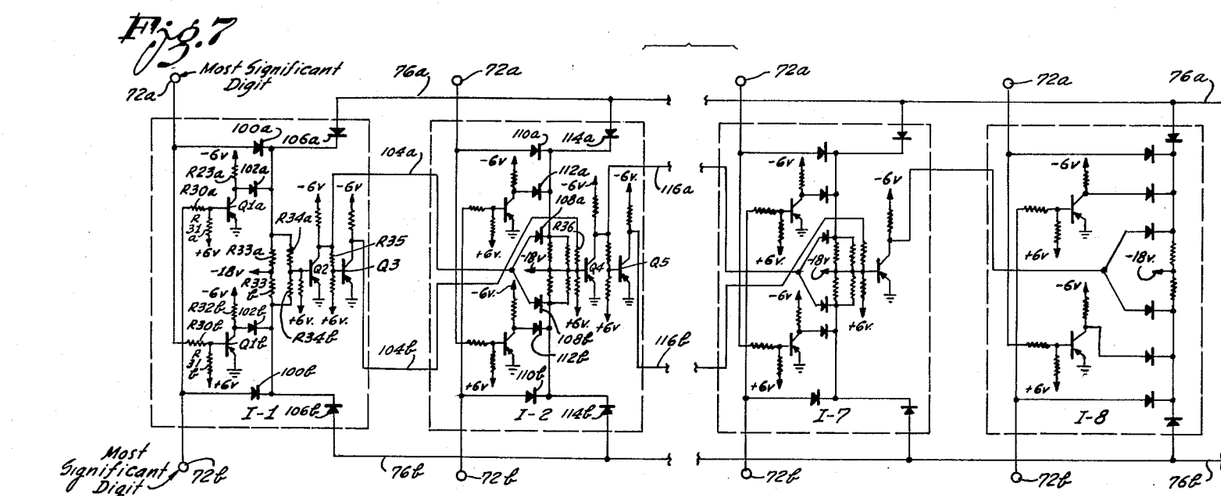
FIGURE 7 is a detailed wiring diagram of the digital section of the comparator.

FIGURE 7 illustrates in detail the circuitry of a preferred embodiment of the digital section 22a of comparator 22. Stages I-1 and I-2 are shown in detail, and together illustrate interconnections between successive stages. Stages I-2 through I-6 are identical, and stages I-1, I-7 and I-8 differ from them only in the deletion of unrequired elements. Stages I-7 and I-8 are also detailed in FIGURE 7. The input terminal 72a to stage I-1 is connected to the anode of a diode 100a and to the base of a transistor Q1b through a resistor R30b. The base of transistor Q1b is biased at +6 volts through resistor R31b. The collector of transistor Q1b is connected to −6 volts through a load resistor R32b, and the emitter is connected to ground. The collector of transistor Q1b is connected to the anode of diode 102b, the cathode of which is connected to one end of a resistor R33b, the other end being connected to −18 volts. The other input terminal 72b to stage I-1 is similarly connected to the anode of a diode 100b and to the base of a transistor Q1a. The transistor Q1a corresponds to transistor Q1b and is connected similarly with its collector connected to the anode of diode 102a, the cathode of which is connected to one end of resistor R33a, the other end being connected to −18 volts. The cathode of diode 100a is also connected with the cathode of diode 102a to resistor R33a, and the cathode of diode 100b is connected with the cathode of diode 102b to the resistor R33b.

The cathodes of diodes 100a and 102a are connected through resistor R34a to the base of transistor Q2, and the cathodes of diodes 100b and 102b are similarly connected to the base of Q2 through resistor R34b. The collector of transistor Q2 is connected to the base of another transistor Q3 through a resistor R35. The transistors Q2 and Q3 are connected in grounded emitter circuits like transistors Q1a and Q1b. The collectors of transistors Q2 and Q3 are connected respectively to the interconnecting leads 104a and 104b. The output lead 76a is connected to the cathodes of diodes 100a and 102a through a blocking diode 106a which is oriented to pass negative output signals, and the output lead 76b is similarly connected to the cathodes of diodes 100b and 102b through diode 106b. Stage I-2 is similar to stage I-1 with the addition of diodes 108a and 108b, the anodes of which are both connected to lead 104a and their cathodes being connected to the cathodes of diodes 110a, 112a and 110b, 112b, respectively. The lead 104b is connected to the base of a transistor Q4 which corresponds to transistor Q2 in stage I-1, and the collector of transistor Q4 is resistively connected to the base of transistor Q5 which corresponds with the transistor Q3. The outputs from stage I-2 to output leads 76a and 76b are through diodes 114a and 114b which correspond with diodes 106a and 106b, respectively. Finally, it can be seen that in stage I-7, a transistor corresponding to transistor Q3 in stage I-1 has been omitted, and the components corresponding to resistors R34a and R34b together with the following transistors Q2 and Q3 have been omitted from stage I-8.

Operation of the digital section 22a can be explained by first considering different inputs to stage I-1. Inputs to stage I-1, for example, represent the most siginficant digits respectively of the counters 12 and 24. If a 1 digit appears on input terminal 72a of stage I-1, this means that −6 volts is applied thereto. If a 1 digit exists on input terminal 72b of stage I-1, the carriage 40 is already correctly positioned within the control range of the most significant command digit, but if a 0 digit exists on the input terminal, the servomotor 34 must be properly energized to bring the carriage 40 into the domain of the most significant digit. When −6 volts exists on the input terminal 72a of stage I-1, the −6 volts is applied to the base of transistor Q1b, turning on the transistor Q1b so that the anode of diode 102b is placed at substantially 0 volts. All of the transistors in the digital section 22a of comparator 22 are operated saturated "on" and function as switches. The −6 volts is also applied to the anode of diode 100a. If the input terminal 72b of stage I-1 is also at −6 volts (a 1 digit), then the −6 volts is applied to transistor Q1a, turning on the transistor and placing the anode of diode 102a at substantially 0 volts. The −6 volts is also applied to the anode of diode 100b. Resistor R33a and the diodes 100a and 102a comprise an "and" circuit, and resistor R33b and diodes 100b and 102b is similarly an "and" circuit. Since one of the diodes of each "and" circuit has an anode at zero potential, those diodes, 102a and 102b, will conduct increased current to the −18 volts source. The result is that 0 volts appears on the cathodes of diodes 100a, 102a and 100b, 102b, and are applied respectively to both cathodes of diodes 106a and 106b. The voltage on the connected output leads 76a and 76b from diodes 106a and 106b, respectively, is therefore 0 volts.

If —6 volts exists as before on input terminal 72a, and 0 volts appears on terminal 72b of stage I–1, the anodes of diodes 100a and 102b remain unchanged at —6 volts and 0 volts, respectively, but 0 volts now is applied to the anode of diode 100b and to the base of transistor Q1a turning off the transistor so that —6 volts appears on the anode of diode 102a. The cathode of diode 106b is thus at 0 volts, and since —6 volts is applied to both diodes 100a and 102a, the cathode of diode 106a is placed at —6 volts which is transmitted to lead 76a. This negative output voltage is applied to the differential operational amplifier 28 through diode 78a (FIGURE 4) as described previously and produces a positive forward command signal to servomotor 34. The negative output voltage is blocked out of the other digital stages by output diodes such as diode 114a of stage I–2 similar to the diode 106a. The zero volts on the other output lead 76b is ineffective.

If zero volts exist on both input terminals 72a and 72b of stage I–1, the anodes of diodes 100a and 100b will be at 0 volts and the anodes of diodes 102a and 102b will be at —6 volts. The transistors Q1a and Q1b thus convert a low input voltage into a high output voltage or a high input voltage into a low output voltage, and are thus herein designated converters. The 0 volts on diodes 102a and 100b permits increased current conduction to the —18 volts source, and the cathodes of output diodes 106a and 106b are both placed at 0 volts. Thus, 0 volts are provided to the output leads 76a and 76b by diodes 106a and 106b, respectively, for 0 digit inputs to the stage I–1. If —6 volts (a 1 input) existed on input terminal 72b, with input terminal 72a retaining the zero volts (a 0 input), the diodes 100a and 102a are both placed at zero volts, and the diodes 100b and 102b are placed at —6 volts. Accordingly, the cathode of diode 106a is at 0 volts and the cathode of diode 106b is at —6 volts. The result is that the output leads 76a, due to stage I–1, is placed at 0 volts and the output lead 76b is placed at —6 volts. The negative voltage on output lead 76b produces a negative output voltage from the differential operational amplifier 28 which drives the servomotor 34 in a reversed direction.

When both of the cathodes of the diodes 106a and 106b are at 0 volts, the base of transistor Q2 is slightly positive by voltage divider action of its base bias resistor (to +6 volts) in series with resistors R34a and R34b (which are in parallel). The transistor Q2 remains cut off such that a negative voltage is applied to the base of transistor Q3 so that the transistor Q3 conducts and its collector is at essentially 0 volts. The transistors Q2 and Q3 are controlled converters that provide proper high or low control signals to the next stage I–2. Lead 104a connected to the collector of transistor Q2 is thus at essentially —6 volts which is applied to the anodes of diodes 108a and 108b in stage I–2. The lead 104b connected to the collector of transistor Q3 is at 0 volts and connected to resistor R36 in stage I–2. The 0 volts on lead 104b has no effect on the off condition of transistor Q4 when the cathodes of diodes 114a and 114b are at 0 volts; that is, when the two inputs to stage I–2 are the same or matched. The resistors R34a and R34b essentially comprise an "or" circuit (less the usual diodes) together with the bias resistor connected to the base of transistor Q2. The resistor R36 (stage I–2) is also part of the corresponding "or" circuits in other stages. If either of the cathodes of diodes 106a or 106b is at —6 volts; that is, when the inputs to stage I–1 do not match, the —6 volts through either resistor R34a or R34b produces a suitable negative voltage on the base of the transistor Q2 which turns on the transistor. The collector of transistor Q2 drops to essentially 0 volts and a positive voltage is applied to the base of transistor Q3 which cuts off that transistor. Thus, lead 104a provides a zero voltage to the anodes of diodes 108a and 108b while lead 104b provides —6 volts to the resistor R36. The zero voltage on diodes 108a and 108b clamps the cathodes of output diodes 114a and 114b respectively to a zero output voltage irrespective of whether any pair of the diodes 110a, 112a and 110b, 112b are at —6 volts. An interlock is thus provided which prevents any output from stage I–2 until inputs to stage I–1 are matched.

The —6 volts on resistor R36 produces a negative voltage on the base of transistor Q4 which turns on the transistor Q4 so that a zero clamping voltage also appears on lead 116a corresponding to lead 104a, and is applied to the following stage. The essentially 0 volts on the collector of transistor Q4 cuts off transistor Q5. The —6 volts then on the collector of transistor Q5 is applied through lead 116b to turn on a transistor in the next stage which corresponds to transistor Q2 or Q4 to produce a zero clamp voltage for the second next succeeding stage. This is continued throughout the rest of the digital stages to prevent any output from appearing from any particular stage until the next preceding stage has matched inputs. Stage I–7 does not require a transistor corresponding to the transistor Q3 or Q5 since stage I–8 is the last digital stage and which does not need an interlock.

Figure 8:
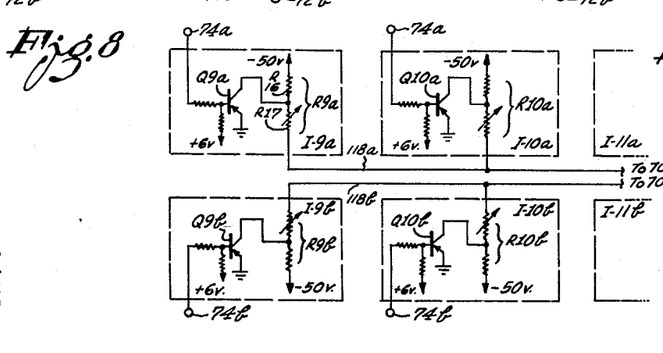
FIGURE 8 is a detailed wiring diagram of the analogue section of the comparator in the preferred system.

The analogue section 22b has been shown and described generally in FIGURE 4, and its operation explained previously with reference to FIGURE 5. FIGURE 8 shows in detail the structure of the stages I–9a, I–9b, I–10a, I–10b, etc. The transistors Q9a, Q9b, Q10a, Q10b, etc. are operated as switches and are either on (saturated) or off. When zero volts (a 1 digit for the analogue stages of counter 12) are applied to input terminal 74a of stage I–9a, for example, the positively biased base of transistor Q9a remains somewhat positive and the transistor is cut off. This corresponds to an open switch S9a in FIGURE 5. The voltage $e_{9a}$ (FIGURE 5) corresponds to the —50 volts supply voltage, and the resistors R16 and R17 are labeled identically in FIGURE 8. When transistor Q9a is cut off, that portion of the output voltage $e_o$ on lead 118a due to stage I–9a, given above in the output equation as $(R18/R9a)e_{9a}$, appears on the output lead 118a. When —6 volts (a 0 digit for the analogue stages of counter 12) is applied to terminal 74a, the transistor Q9a is turned on because of a negative voltage now appearing on the base of the transistor. This, of course, places the common junction between resistors R16 and R17 at essentially 0 volts, and drops the output voltage on lead 118a from stage I–9a to zero. As can be seen in FIGURE 8, there is no interlock device, and the stages I–9a through I–15a as employed in FIGURE 4 can be switched on or off without any definite sequence. Since stages I–9b through I–15b are identical to stages I–9a through I–15a, the former stages operate in the same manner as described above for the latter.

If all of the inputs such as 74b have a zero voltage input (all 1 digits in the corresponding last seven stages of counter 24), a negative voltage of —50 volts would be provided to pin 2 of the operational amplifier 70b (FIGURE 6). Since pin 2 is the inverting input, a positive output voltage of +50 volts would appear at the output. A negative output voltage, however, is desired, to correspond with the negative output voltages from the digital section 22a of the comparator 22. In order to achieve this, the zero adjustment bias circuit 82 is adjusted as mentioned previously to shift the zero point such that the +50 volts is reduced to 0 volts. This zero adjustment would then change a 0 volts output from the operational amplifier 70b to —50 volts, which is produced when all of the inputs 74b have —6 volts applied thereto (all 0 digits in the corresponding last seven stages of counter 24). This —50 volts is divided down to approximately —5 volts as described previously, and can be overridden by the —6 volts from the digital section 22a, when present. The zero adjustment bias circuit for the operational amplifier 70a can be similarly adjusted to provide negative output voltages.

It is to be noted that since 0 volts at the input of operational amplifier 70b corresponds with −50 volts output, and −50 volts at the input of 70b corresponds with 0 volts at its output because of the above bias adjustment zero shift, as the input voltage to 70b increases negatively, the output decreases negatively. In short, an increasing input produces a decreasing output and a decreasing input produces an increasing output. For this reason, the complements of the digits in each of the analogue stages of counter 24 have been provided as inputs to the analogue section 22b. Thus, for the analogue stages or the last seven stages of counters 12 and 24, the complements of the number content for each of these stages are provided to the analogue section 22b of comparator 22. Since the complement of a number increases for a decreasing number and decreases for an increasing number, the above condition wherein an increasing input produces a decreasing output and a decreasing input produces an increasing output is satisfied.

There is an advantage, however, in having normal positive output voltages from the operational amplifiers 70a and 70b for negative input voltages thereto. The advantage is that of a wider linear operational range for the operational amplifiers without saturation. There is a tendency for an earlier saturation limit of the common commercial operational amplifiers when bias adjustment is unusually high, as may be the case where the bias is adjusted to shift the normal zero level excessively. In the above instance where bias is adjusted so that 0 volts input normally producing 0 volts output is changed to −50 volts output, the limits for reliable operation without tendency of saturation is reduced. An alternate arrangement which would permit use of the normal positive output voltages from the operational amplifiers 70a and 70b can be obtained by simply inverting the −6 volts that can appear on leads 76a or 76b to +6 volts, and then reversing the orientation of diodes 78a and 78b. The use of complement inputs to the analogue section 22b is not changed in such an arrangement since as the input voltage to operational amplifier 70a or 70b increases negatively (from 0 volts), the output decreases negatively (increases positively from 0 volts), and as the input voltage decreases negatively (from −50 volts) the output increases negatively (decreases positively from +50 volts), as before.

Figure 9:
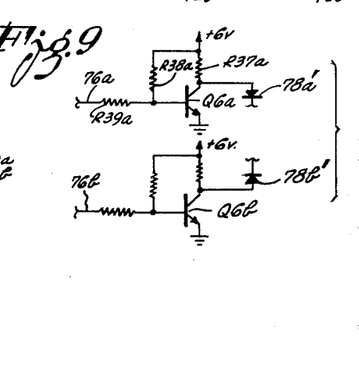
FIGURE 9 is a fragmentary wiring diagram illustrating a modification to the system for inverting output signals from the digital section of the comparator.

FIGURE 9 illustrates the modification necessary to invert the −6 volts that can appear on leads 76a or 76b to +6 volts. Transistors Q6a and Q6b are inserted in leads 76a and 76b, respectively, before diodes 78a′ and 78b′ which correspond to diodes 78a and 78b. The transistors Q6a and Q6b are NPN type transistors as contrasted to the rest which are PNP type transistors. The collector of transistor Q6a is connected to +6 volts through a load resistor R37a and its emitter is grounded. The base of the transistor Q6a is connected to the +6 volts supply through resistor R38a, and the base is also connected to lead 76a through resistor R39a. The collector of transistor Q6a is connected to the anode of the diode 78a′. When 0 volts exist on lead 76a, the base of transistor Q6a is positive and the transistor is turned on (conducts) to provide substantially 0 volts to the anode of diode 78a′. A negative voltage of −6 volts on lead 76a, however, cuts off the transistor Q6a such that +6 volts is applied to the anode of diode 78a′ and which is transmitted by the diode. Thus, a −6 volts input is inverted into +6 volts, and 0 volts input is correctly "inverted" to remain 0 volts. The transistor Q6b is connected exactly as Q6a and functions in like manner as an inverter. Since a positive (+6 volts) output is provided through diode 78b′, for example, the operational amplifier 70b (FIGURE 6) can have its bias circuit 82 adjusted normally to provide approximately 1.3 volts on pin 1, which produces 0 volts output on pin 6 for 0 volts input on pin 2 and an increasing (negative) input produces an increasing (positive) output. The operational amplifier 70a can be adjusted similarly since a positive output is provided through diode 78a′. Positive input voltages are now applied to the differential operational amplifier 28 (FIGURE 1) with the result that negative output voltages therefrom become forward command signals and positive output voltages are reverse command signals. These output voltages are chopped and amplified as before but are applied to motor 34 on reversed (phase windings) leads. It is, of course, equally feasible instead to interchange lead connections at the two inputs of the differential operational amplifier 28 (leads to pins 1 and 2 of the operational amplifier 80c in FIGURE 6 can be cross switched).

The digital section 22a as illustrated in FIGURE 7 can be described clearly in logical terms. Considering stage I-1, for example, the diodes 100a and 102a are connected in a first "and" circuit having two separate inputs and an output. The transistor Q1a is connected as a converter which converts 0 volts on input terminal 72b to −6 volts output, or −6 volts on terminal 72b to 0 volts output. It is noted that in logical terms, the converters designated herein are commonly termed "inverters" because the device inverts a 0 digit into a 1 digit, and vice versa. The output of converter Q1a is connected to an input (anode of diode 102a) of the above "and" circuit, and the other input (anode of diode 100a) is connected to input terminal 72a. A second "and" circuit including diodes 100b and 102b corresponds to the above described first "and" circuit and the transistor Q1b is connected as a converter corresponding to the converter Q1a. Input terminal 72a is connected to converter Q1b which has its output connected to an input of the second described "and" circuit, the other input of this "and" circuit being connected to input terminal 72b.

The output from each of the two "and" circuits are connected to respective inputs of an "or" circuit including resistors R34a and R34b having an output connected to the base of transistor Q2. The output of the first "and" circuit is also connected to an input (diode 106a) of a multiple input "or" circuit including diodes 106a, 114a, etc. Similarly, the output of the second "and" circuit is also connected to an input (diode 106b) of a multiple input "or" circuit including diodes 106b, 114b, etc. Transistor Q2 is connected as a converter (or "inverter" in common logic terminology) and the transistor Q3 is similarly a converter. The output of converter Q2 is connected to diodes 108a and 108b which respectively comprise third inputs to "and" circuits in stage I-2 which correspond with the first and second "and" circuits previously described for stage I-1. The output of converter Q2 is also connected to the input of the converter Q3, the output of converter Q3 being connected to resistor R36 (of stage I-2) which is the third input to an "or" circuit corresponding to the one in stage I-1.

The foregoing summary of the logic of the digital section 22a can be extended accordingly to provide a full and complete description of my invention. Each of the logical elements is not limited, of course, to any specific means. For example, the converters can be any suitable device as may be desired or required, and can include ordinary switches, electron tube circuits, pulse transformers, etc. Similarly, the "or" and "and" circuits are not limited to diode circuits but can also include magnetic core devices, ordinary switches, etc. which are suitably connected in the desired "or" or "and" circuitry. Further, the logic of the invention, or any portion or part thereof, is also applicable and useful in synchronous systems, as in computer circuits which are synchronized by a clock source.

While the system described above is reversible in operation, the carriage 40 (FIGURE 1) is actually positioned accurately without overshoot in any control movement. That is, if the carriage 40 is to be positioned from some point, for example, in the forward direction to a point N, the carriage 40 is driven by servomotor 34 generally according to curve 64 and 68a (FIGURE 3) to point N and does not involve any part of curve 68b to return the carriage 40 because of any overshoot. It should be noted that FIGURES 1, 2 and 3 are generally applicable to the overall invention, but are particularly descriptive of the version of invention illustrated in FIGURES 10a and 10b. For example, when an overriding voltage appears on lead 76a or 76b (FIGURE 4) through the diodes 78a or 78b, respectively, the differential output voltage from the differential operational amplifier 28 will be actually dependent upon the output voltages of the operational amplifiers 70a and 70b. Since the output voltages of the operational amplifiers 70a and 70b are respectively dependent on the digital contents of the last seven digit stages of counters 12 and 24; the output voltage of each increases negatively with the number in the last seven counter stages according to the equation given above in connection with FIGURE 5, the overriding output voltage combined with the opposing output voltage from operational amplifiers 70a or 70b produces a differential output voltage from the differential operational amplifier 28 which is largest for zero volts output from 70a or 70b and smallest for −5 volts (divided down from −50 volts) output from 70a or 70b, as combined with the particular overriding voltage of −6 volts. Thus, the smaller the number in the last seven counter stages (in order of significant digits), the greater will be the differential output voltage produced from the differential operational amplifier 28. The servomotor 34 is therefore driven at full forward or reverse speeds because of overriding voltages only when, for example, the most significant digit of each of the last seven stages of counters 12 and 24 are zero. That is, the speed of servomotor 34 is governed principally by the binary number contents in the last seven digit stages of the counters 12 and 24, in the above described system.

The system described above (FIGURES 1 and 4) operates very well in a servo positioning system, and in a slowly changing servo follower system, wherein the contents of the reference position counter 12 is not changed rapidly (essentially fixed relative to the changing contents of the true position counter during each matching or positioning interval). The digital section 22a alone can, of course, comprise a comparator for use in a servo system which does not require proportional control, as in a relay type or discrete incremental control system. There are many systems that are particularly suited for discrete, incremental control. In this instance, the analogue section 22b is simply deleted and the outputs of the digital section 22a are applied directly to the differential operational amplifier 28. The digital stages of the digital section 22a can be increased as necessary to accept all of the outputs from the counters 12 and 24. Complements would not then be required with the omission of the analogue section 22b.

Figure 10A:
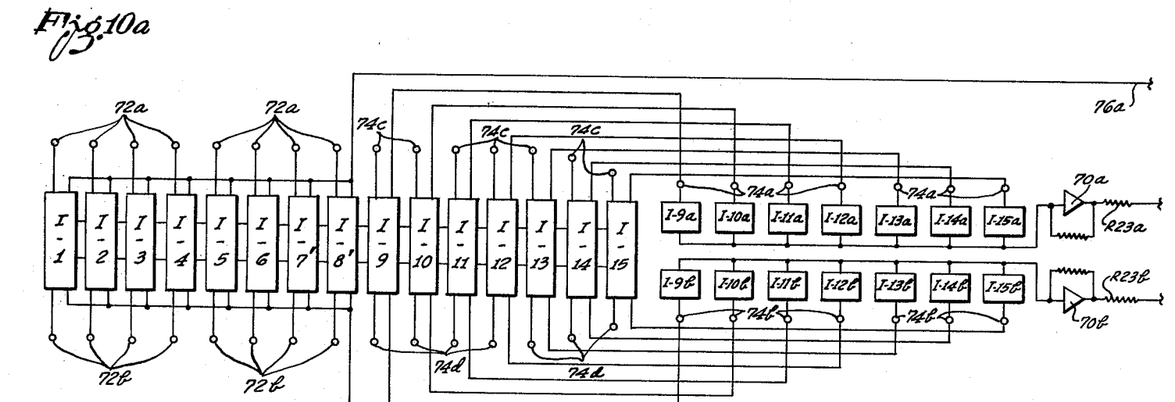
FIGURES 10a and 10b, together, show circuitry for an extremely smooth running version of a digital servo positioning and follower system.
Figure 10B:
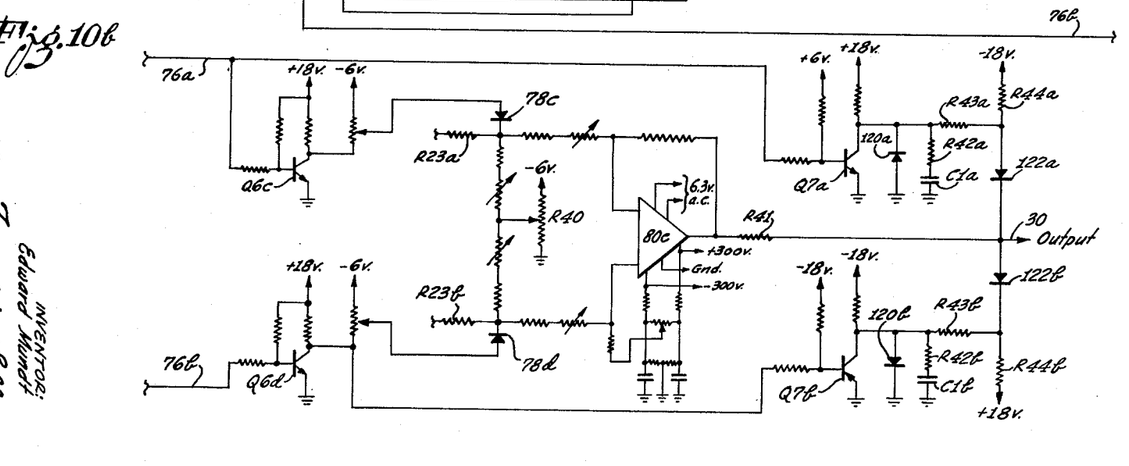

FIGURES 10a and 10b, together, illustrate a modified version of comparator 22 and its connection with the differential operational amplifier 28 to produce a desirable output signal therefrom, whereby a continuous positioning and follower servo system is obtained. The circuit of FIGURE 10a is somewhat similar to that shown in FIGURE 4. In the circuit shown in FIGURE 10a, there are fifteen digital stages I-1 through I-6, I-7', I-8', and I-9 through I-15 which accept the digital outputs of the reference position counter 12 and the true position counter 24 (FIGURE 1). The analogue section 22b is now actually a weighting section connected to receive the individual outputs from the additional digital stages I-9 through I-15 as indicated in FIGURE 10a. The output of upper and lower halves of the analogue section is in progressively diminishing steps of differential output voltage which is linearly averaged by the servomotor. As in the original digital section 22a, the first and last two digital stages (I-1, I-14 and I-15) are slightly different from the rest of the digital stages in that portions of the interlock circuitry are not required. The first eight most significant digit outputs from the counters 12 and 24 are applied respectively to terminals 72a and 72b as before. However, the remaining seven (complement) digit outputs from the counters 12 and 24 are no longer applied to the input terminals 74a and 74b of the analogue section 22b, but are applied instead to terminals 74c and 74d of the enlarged digital section of the comparator 22, and the outputs of the additional stages I-9 through I-15 are applied respectively to the corresponding stages of the analogue section 22b. Interlocks are provided between all of the fifteen digital stages, so that sequential matching of digital stages is performed and misleading algebraic difference or phase conditions of the analogue section digits that may arise in the servo comparator version shown in FIGURE 4, and presented to the servomotor, are avoided during rapid follower operation.

The combined outputs of digital stages I-1 through I-6, I-7' and I-8' appear on leads 76a and 76b similarly as before. The outputs on leads 76a and 76b are inverted and combined with the outputs of the analogue section which are coupled through resistors R23a and R23b to the inputs of the operational amplifier 80c, which is connected as a differential operational amplifier. Since there are interlocks between all of the digital stages, driving signals do not appear simultaneously from leads 76a or 76b and from operational amplifiers 70a or 70b (which have balanced, equal outputs that do not produce a driving differential output signal when lead 76a or 76b is active). The output signals on leads 76a and 76b are also used to increase the positive or negative output voltage from operational amplifier 80c to a saturating output voltage (in this version) when the signal on leads 76a or 76b persist longer than, for example, 11 milliseconds. The saturating output voltage saturates the servo amplifier (32) which then drives the servomotor (34) at full forward or reverse speeds until such time that the inputs to digital stages I-1 throuogh I-6, I-7' and I-8' are matched, and zero outputs exist on leads 76a and 76b. The circuitry for accomplishing the inverting and saturating actions just described is shown in FIGURE 10b. The leads 76a and 76b are continued from FIGURE 10a, and resistors R23a and R23b are shown again (duplicated) in FIGURE 10b to indicate accurately the connections of these resistors in the circuit of FIGURE 10b. Transistors Q6c and Q6d correspond with transistors Q6a and Q6b, respectively, of FIGURE 9, and are inverters. The inverted output from transistors Q6c and Q6d are coupled to the analogue output as before through diodes 78c and 78d, corresponding with diodes 78a' and 78b' of FIGURE 9. The diodes 78c and 78d are respectively back biased negatively when transistors Q6c and Q6d are conductive. The input network and associated circuitry to the operational amplifier 80c is generally similar to that shown in FIGURE 6. An adjustable potentiometer R40 connecting −6 volts to ground provides a negative center balance point voltage to reduce the positive voltage which is applied to the inputs of the operational amplifier 80c from either the digital stages through diodes 78c or 78d, or the analogue stages through operational amplifiers 70a or 70b, so that operation of the operational amplifier 80c is kept within its linear operating range at all times, and particularly to prevent an excessively large positive voltage from being applied to both inputs of the operational amplifier 80c during quiescent conditions. For example, when the digits of corresponding counter stages of counters 12 and 24 are matched, 0 volt outputs are applied respectively to corresponding inputs of the analogue comparator stages such that −50 volts are provided to both operational amplifiers 70a and 70b, to produce +50 volts outputs from each. These outputs are both divided down to +5 volts, and then applied to separate inputs of the differential amplifier 80c. This maximum input voltage (5 or 6 volts) preferably should not be applied simultaneously to both inputs of most ordinary, commercially available differential operational amplifiers, especially for extended periods of time. The bias for each of the operational amplifiers 70a and 70b is adjusted to produce a correspondingly suitable zero output voltage from each operational amplifier, for a zero input thereto. A positive or negative linear differential output signal is obtained from the operational amplifier 80c through isolating resistor R41. Inputs to the operational amplifier 80c are suitably connected to produce a positive forward command signal and a negative reverse command signal for the servomotor.

The lead 76a is also connected to the base of transistor Q7a which is connected as an inverter having an output clamped negatively to ground by diode 120a. A series resistance-capacitance circuit including resistor R42a and capacitor C1a is connected in parallel with diode 120a. Resistor R43a connects the clamped and generally integrated output to control a negative diode limiter comprising diode 122a connected in series with resistor R44a. The cathode of diode 122a is connected to the output lead 30 of the operational amplifier 80c, the resistor R43a is connected to the common junction between diode 122a and resistor R44a, and the other end of resistor R44a is connected to a negative supply voltage of —18 volts. When 0 volts appears on lead 76a, the transistor Q7a becomes conductive such that its collector is at essentially 0 volts. Capacitor C1a discharges quickly through resistor R42a and the transistor Q7a, and the anode of diode 122a is maintained at a negative back biasing potential sufficient to buck any negative output voltage from operational amplifier 80c or a negative saturating output voltage provided to output lead 30 through resistor R43b and diode 122b from a negative supply of —18 volts. When —6 volts exists on lead 76a, the transistor Q7a is cut off and the capacitor C1a is gradually charged positively. The collector of transistor Q7a is resistively connected to approximately +18 volts and the anode of diode 122a is placed at approximately +6 volts after 11 milliseconds, so that a postive saturating output voltage is provided to output lead 30 through diode 122a. The cathode of diode 122b is positively back biased sufficiently to prevent forward conduction through it (transistor Q7b is conducting). Thus, when the first eight most significant digit stages of the digital section (FIGURE 10a) do not all produce a 0 volt output on lead 76a after, for example, 11 milliseconds, the output of the differential operational amplifier 28 is increased by an auxiliary positive saturating voltage which is provided through diode 122a.

Transistor Q7b restores the original polarity of the output signals from transistor Q6d to that appearing on lead 76b. The output of transistor Q7b is clamped positively to ground by diode 120b and the balance of the circuit is similar to that for the transistor Q7a. A positive diode limiter comprising diode 122b connected in series with resistor R44b (connected to a positive supply voltage) is connected in a circuit which provides a negative saturating output voltage on lead 30 when —6 volts exists on lead 76b more than 11 milliseconds, for example. When 0 volts exists on lead 76b, a negative voltage is applied to the base of transistor Q7b such that the PNP type transistor is conductive and the collector is at essentially 0 volts. The capacitor C1b discharges quickly through resistor R42b and the transistor Q7b, and the cathode of diode 122b is then maintained at a positive back biasing potential sufficient to buck any positive linear output voltage from the operational amplifier 80c or a positive saturating output voltage provided to output lead 30 through resistor R43a and diode 122a from a positive supply of +18 volts. When —6 volts appears on lead 76b, approximately 0 volts is applied to the base of transistor Q7b and the transistor is cut off. The result is that capacitor C1b gradually charges negatively and the cathode of diode 122b is gradually reduced to and held at approximately —6 volts after, for example, 11 milliseconds and a negative saturating output voltage is thus provided to output lead 30 through diode 122b. The anode of diode 122a is negatively back biased sufficiently to prevent conduction through it by the negative saturating voltage on lead 30 (transistor Q7a is conducting). Thus, when all of the first eight most significant digit stages of the digital section (FIGURE 10a) do not all provide a 0 volt output on lead 76b, the output of the differential amplifier 28 is increased by an auxiliary negative saturating voltage which is provided through diode 122b.

A negative voltage on lead 76a should produce a positive forward command signal to servomotor 34, and a negative voltage on lead 76b should produce a negative output voltage from the differential amplifier 28 to drive the servomotor 34 in a reversed direction. Since —6 volts would appear only on leads 76a or 76b when the digit contents of the first eight most significant digit stages of counters 12 and 24 (FIGURE 1) are not matched and interlocks are provided between all of the digital stages, the output from the differential amplifier 28 is restricted to a positive linear range output command signal when —6 volts appears on lead 76a, and is restricted to a negative linear range output command signal when —6 volts appears on the lead 76b. Accordingly, the output of the differential amplifier 28 is increased by a saturating voltage of a correct polarity, and the saturating voltage is made available only after a suitable time delay determined by capacitors C1a and C1b and the load resistors of transistors Q7a and Q7b, respectively. These delayed saturating voltages do not produce noticeably abrupt or sharp responses of the servomotor 34 as may result from unwarranted strong saturating signals which are unnecessary or undesirable except for large, prolonged digital differences in counters 12 and 24. In particular, the charging of the capacitor C1a, for example, during changes of signal voltage on lead 76a from 0 to —6 volts causes a gradual transition from the permissible negative back biasing voltage on diode 122a to a saturating positive driving voltage output through the diode 122a. The charging of capacitor C1b acts similarly on the permissible positive back biasing voltage on diode 122b to produce a saturating negative driving voltage output through the diode 122b following changes of signal voltage on lead 76b from 0 to —6 volts. The capacitors C1a and C1b are, however, discharged rapidly for changes of signal voltage on leads 76a and 76b from —6 volts to 0 volts. A limiting diode back biasing voltage condition is thus changed to a saturated output driving voltage much less rapidly than change of the saturated output driving voltage to the limiting diode back biasing voltage condition. The delay time of 11 milliseconds is selected to be approximately equivalent to sixteen changes of the least significant digit in a counter. The maximum rate that the least significant digit is changed is once every 680 microseconds, for example. Abrupt starts and stops are eliminated, and a smooth transition of forward and reverse motion of the servomotor 34 is produced. The version of servo system resulting from the circuitry shown in FIGURES 10a and 10b has yielded an extremely smooth running and effectively operating positioning and follower system.

It is to be understood that the particular embodiment of my invention described above and shown in the drawings is merely illustrative of and not restrictive of the broad invention, and that various changes in design, structure and arrangement may be made without departing from the spirit and scope of the broader of the appended claims.

I claim:

1. In a servo system, a first $(m+n)$-stage digital counter; a second $(m+n)$-stage digital counter; a comparator having a digital section and an analogue section, the digital section including means for comparing the contents of the $m$ stages of said first and second counters and generating a first output signal of predetermined magnitude when the contents of the $m$ stages of said first digital counter is greater than the contents of the $m$ stages of said second digital counter, and generating a second output signal of the same predetermined magnitude when the contents of the $m$ stages of said second digital counter is greater than the contents of the $m$ stages of said first digital counter, and the analogue comparator section including means for converting the contents of the $n$ stages of said first digital counter into a third output signal of magnitude proportional to the contents of the $n$ stages thereof, means for converting the contents of the $n$ stages of said second digital counter into a fourth output signal of magnitude proportional to the contents of the $n$ stages thereof, the third and fourth output signals having a predetermined maximum magnitude smaller than the predetermined magnitudes of the first and second output signals, and means for combining the first and second output signals respectively with the third and fourth output signals; and a differential operational amplifier having the combined output signals applied thereto to provide an output signal of one polarity when the contents of said first digital counter is greater than that of said second digital counter and of reversed polarity when such condition is reversed, the output signal of said differential operational amplifier being proportional to the difference in magnitude of the combined signal pairs.

2. The invention according to claim 1 including, in addition, a device movable within a reference frame, a servomotor adapted to drive and position said movable device in the reference frame, said servomotor being responsive to the output of said differential operational amplifier, and wherein the contents of said first digital counter describes a commanded position for said movable device in the reference frame and the contents of said second digital counter describes an instantaneous true position of said movable device in the reference frame.

3. A comparator for comparing contents of a first $(m+n)$-stage digital counter with that of a second $(m+n)$-stage digital counter, comprising: a digital comparator section including means for comparing the contents of the $m$ stages of the first and second digital counters and generating a first output signal of predetermined magnitude when the contents of the $m$ stages of the first digital counter is greater than the contents of the $m$ stages of the second digital counter, and generating a second output signal of the same predetermined magnitude when the contents of the $m$ stages of the second digital counter is greater than the contents of the $m$ stages of the first digital counter; an analogue comparator section including means for converting the contents of the $n$ stages of the first digital counter into a third output signal of magnitude proportional to the contents of the $n$ stages thereof, and means for converting the contents of the $n$ stages of the second digital counter into a fourth output signal of magnitude proportional to the contents of the $n$ stages thereof, the third and fourth output signals having a predetermined maximum magnitude smaller than the predetermined magnitude of the first and second output signals; means for combining the first and second output signals respectively with the third and fourth output signals; and means for comparing the magnitudes of the combined pairs of signals.

4. A comparator for comparing contents of a first $(m+n)$-stage digital counter with that of a second $(m+n)$-stage digital counter, comprising: a digital comparator section including means for comparing the contents of the $m$ stages of the first and second digital counters and generating a first output signal when the contents of the $m$ stages of the first digital counter is greater than the contents of the $m$ stages of the second digital counter, and generating a second output signal when the contents of the $m$ stages of the second digital counter is greater than the contents of the $m$ stages of the first digital counter; an analogue comparator section including means for converting the contents of the $n$ stages of the first digital counter into a third output signal proportional to the contents of the $n$ stages thereof, and means for converting the contents of the $n$ stages of the second digital counter into a fourth output signal proportional to the contents of the $n$ stages thereof; and means responsively energized in one mode of operation to the first and third output signals, and in another mode to the second and fourth output signals.

5. In a servo system, a first $(m+n)$-stage digital counter; a second $(m+n)$-stage digital counter; a comparator having a digital section and an analogue section, the digital section including means for comparing the contents of the $m$ stages of said first and second counters and generating a first output signal when the contents of the $m$ stages of said first digital counter is greater than the contents of the $m$ stages of said second digital counter, and generating a second output signal when the contents of the $m$ stages of said second digital counter is greater than the contents of the $m$ stages of said first digital counter, and the analogue comparator section including means for converting the contents of the $n$ stages of said first digital counter into a third output signal proportional to the contents of the $n$ stages thereof, means for converting the contents of the $n$ stages of said second digital counter into a fourth output signal proportional to the contents of the $n$ stages thereof, and means for combining the first, second, third and fourth output signals into two pairs of combined output signals; and an amplifier having the combined output signals applied thereto to provide an output signal of one polarity when the contents of said first digital counter is greater than that of said second digital counter and of reversed polarity when such condition is reversed.

6. The invention according to claim 5 wherein said digital comparator section includes, in addition, interlock means connected between the $m$ comparator stages for preventing the generation of output signals from a next succeeding comparator stage until digit contents compared by an instant digital comparator stage are matched.

7. A comparator for comparing contents of a first $(m+n)$-stage digital counter with that of a second $(m+n)$-stage digital counter, comprising: a digital comparator section including $(m+n)$ comparator stages for respectively comparing individual stage contents of the $(m+n)$ stages of the first and second digital counters, each said $(m+n)$ comparator stages generating a first output signal when the contents of the respective stage of the first digital counter is greater than the contents of the corresponding stage of the second digital counter, and generating a second output signal when the contents of the respective stage of the second digital counter is greater than the contents of the corresponding stage of the first digital counter; an analogue comparator section including $n$ stages respectively receiving the first output signals of the $n$ digital comparator stages and converting the same into a single third output signal proportional to the contents of the $n$ stages of the first digital counter, and another $n$ stages respectively receiving the second output signals of the $n$ digital comparator stages and converting the same into a single fourth output signal proportional to the contents of the $n$ stages thereof; means for combining the first, second, third and fourth output signals into two pairs of combined output signals; and amplifier means having the combined output signals applied thereto to provide an output signal therefrom of one polarity when the contents of said first digital counter is greater than that of said second digital counter, and of reversed polarity when such condition is reversed.

8. The invention according to claim 7 wherein said digital comparator section includes, in addition, interlock means connected between at least the $m$ comparator stages for preventing the generation in such stages of output signals from a next succeeding digital comparator stage until digit contents compared by an instant digital comparator stage are matched.

9. In a servo system, a first $(m+n)$-stage digital counter; a second $(m+n)$-stage digital counter; a comparator having a digital section and an analogue section, the digital section including $(m+n)$ comparator stages for respectively comparing the individual stage contents of the $(m+n)$ stages of said first and second counters, each of said $(m+n)$ comparator stages generating a first output signal when the contents of the respective stage of said first digital counter is greater than the contents of the corresponding stage of said second digital counter, and generating a second output signal when the contents of the respective stage of said second digital counter is greater than the contents of the corresponding stage of said first digital counter, and the analogue comparator section including $n$ stages respectively receiving the first output signals of the $n$ digital comparator stages and converting the same into a single third output signal proportional to the contents of the $n$ stages of said first digital counter, and another $n$ stages respectively receiving the second output signals of the $n$ digital comparator stages and converting the same into a single fourth output signal proportional to the contents of the $n$ stages of said second digital counter; means for combining the first and second output signals of the $m$ digital comparator stages and the third and fourth output signals; and an operational amplifier having the combined output signals applied thereto to provide an output signal therefrom of one polarity when the contents of said first digital counter is greater than that of said second digital counter, and of reversed polarity when such condition is reversed.

10. The invention according to claim 9 wherein said digital comparator section includes, in addition, interlock means connected between at least the $m$ comparator stages for preventing the generation in such stages of output signals from a next succeeding digital comparator stage until digit contents compared by an instant digital comparator stage are matched.

11. The invention according to claim 9 including, in addition, a device movable within a reference frame, a servomotor adapted to drive and position said movable device in the reference frame, said servomotor being responsive in speed and direction respectively to the magnitude and polarity of the output signal of said operational amplifier, and wherein the contents of said first digital counter describes a commanded position for said movable device in the reference frame and the contents of said second digital counter describes an instantaneous true position of said movable device in the reference frame.

12. The invention according to claim 9 including, in addition, means responsive to the first and second output signals of the $m$ digital comparator stages for generating a saturating output voltage in the output of said operational amplifier.

13. The invention according to claim 12 including, in addition, means for delaying generation of the saturating output voltage for a predetermined period of time.

14. A comparator for comparing contents of a first $n$-stage digital counter with that of a second $n$-stage digital counter and providing first and second output signals for respectively indicating when the contents of the first digital counter is greater than that of the second digital counter and when such condition is reversed, comprising: $n$ comparator stages corresponding with the $n$ stages of the first and second digital counters, each comparator stage including a first and second "and" circuit each having at least three inputs and an output, means for applying the output of a corresponding stage of the first digital counter and the complement output thereof respectively to first inputs of said first and second "and" circuits, means for applying the output of a corresponding stage of the second digital counter and the complement output thereof respectively to second inputs of said first and said second "and" circuits, first output means of the instant comparator stage connected to the output of said first "and" circuit, second output means of the instant comparator stage connected to the output of said second "and" circuit, and interlock means responsive to the outputs of said first and second "and" circuits and having an output connected to third inputs of said first and second "and" circuits of a next succeeding comparator stage for controlling output from the first and second output means of the next succeeding comparator stage, an output being obtainable from the next succeeding comparator stage when the outputs respectively from corresponding stages of the first and second digital counters are matched, said interlock means comprising an "or" circuit having first, second and third inputs and an output, said "or" circuit providing a "high" output voltage for "high" input voltages to any of the three inputs, the first and second inputs of said "or" circuit being connected respectively to the outputs of said first and second "and" circuits, means connecting a "high" input voltage to the third inputs of the first and second "and" circuits of the next succeeding comparator stage, means connecting a "low" clamping voltage to the third input of the "or" circuit of the next succeeding comparator stage, switching means for converting the "high" input voltage to a "low" clamping voltage to the third inputs of the first and second "and" circuits of the next succeeding comparator stage and for converting the "low" clamping voltage to a "high" input voltage to the third input of the "or" circuit of the next succeeding comparator stage, said switching means being connected to the output of said "or" circuit and operably responsive to a "high" output voltage therefrom, whereby the "low" clamping voltage to the third inputs of the first and second "and" circuits of the next succeeding comparator stage is applied to clamp the outputs thereof to zero output and the "high" input voltage to the third input of the "or" circuit of the next succeeding comparator stage produces a "high" output voltage therefrom to operate switching means of the next succeeding comparator stage, when said switching means of the instant comparator stage is operated.

15. A comparator for comparing contents of a first $(m+n)$-stage digital counter with that of a second $(m+n)$-stage digital counter, comprising: a digital comparator section including means for comparing the contents of the $m$ stages of the first and second digital counters and generating a first output signal when the contents of the $m$ stages of the first digital counter is greater than the contents of the $m$ stages of the second digital counter, and generating a second output signal when the contents of the $m$ stages of the second digital counter is greater than the contents of the $m$ stages of the first digital counter, and interlock means connected between the $m$ comparator stages for preventing generation of output signals from a next succeeding comparator stage until digit contents compared by an instant digital comparator stage are matched; an analogue comparator section including means for converting the contents of the $n$ stages of the first digital counter into a third output signal proportional to the contents of the $n$ stages thereof, and means for converting the contents of the $n$ stages of the second digital counter into a fourth output signal proportional to the contents of the $n$ stages thereof; and means responsively energized in one mode of operation to the first and third output signals, and in another mode to the second and fourth output signals.

References Cited in the file of this patent

UNITED STATES PATENTS

| 2,844,309 | Ayres | July 22, 1958 |
|---|---|---|
| 2,885,659 | Spielberg | May 5, 1959 |
| 2,907,003 | Hobbs | Sept. 29, 1959 |
| 2,927,258 | Lippel | Mar. 1, 1960 |
| 2,953,773 | Di Nicolantonio | Sept. 20, 1960 |